April 20, 1937.                J. G. JACKSON                2,077,757
                          BAKING PAN AND MATERIAL
                            Filed Aug. 17, 1936

Inventor
Joseph G. Jackson
By Charles S. Wilson
Attorney

Patented Apr. 20, 1937

2,077,757

UNITED STATES PATENT OFFICE 2,077,757

BAKING PAN AND MATERIAL

Joseph G. Jackson, Oak Park, Ill., assignor to Edward Katzinger Company, Chicago, Ill., a corporation of Illinois Application August 17, 1936, Serial No. 96,376

6 Claims. (Cl. 53—6)

This invention relates to baking pans and the material from which they are made, whereby the pan will present a pleasing and appealing appearance, will not be easily scarred or marked, and will have increased strength and resistance to denting and warping. It also contemplates a pan wherein the grease, if any, used in baking will be evenly distributed over the inner surfaces of the pan and the pan surfaces in direct contact with the dough therein will be increased to improve the bake.

With the above and other objects in view, as will be apparent, this invention consists in the construction, combination and arrangement of parts all as hereinafter more fully described, claimed and illustrated in the accompanying drawing, wherein:

Figure 3:
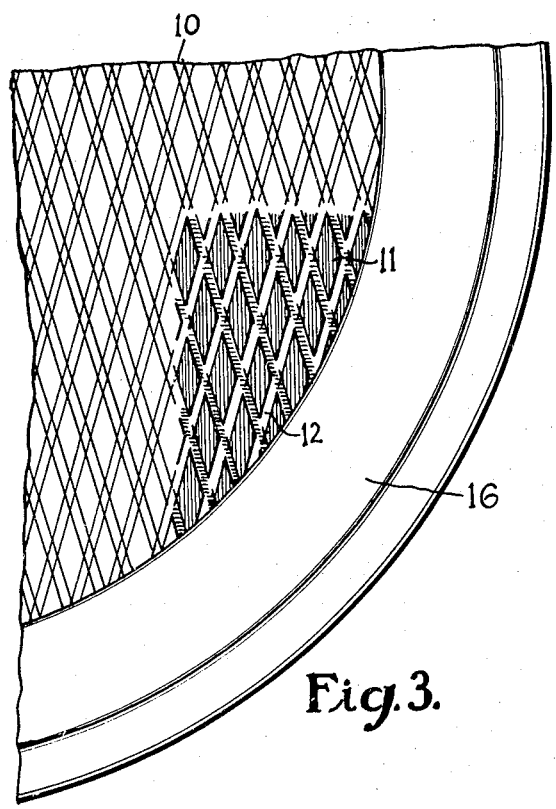
Figure 4:
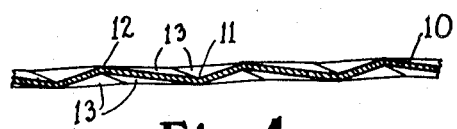

Fig. 3 likewise is a fragmentary elevation of a pie plate showing the present invention as applied thereto; and Fig. 4 is a section through a wall of a pan made in accordance with this invention to illustrate the formation and construction thereof.

Heretofore, in the manufacture of baking pans the material or metal used has generally had a plain, smooth, uninterrupted and generally a polished surface with the result that every defect in the material, all dents placed therein from one cause or another and all finger prints, smudges, and the like appeared thereon and often were emphasized. Therefore, the smooth, plain, polished surface of the pan walls in addition to being easily marred and dented, did not present a particularly attractive appearance on display, especially after the article has been frequently handled.

In addition to this, the average baking pan made of smooth, flat material warps easily and frequently becomes distorted unless the gauge or thickness of the metal from which the pan is made is greatly increased. This is particularly true of relatively large and shallow pans such as cookie sheets. It is customary to grease the interior of a baking pan prior to placing the dough therein and in the pans prior hereto the smooth uninterrupted surfaces thereof have provided no means for holding such grease and causing an even distribution thereof.

The present invention contemplates a baking pan that will overcome the objectionable features of the prior pans, by providing an over-all geometric design or pattern in one or more of the pan walls which will produce a series of alternate depressions and elevations throughout the surface of the pan wall. When the material of the pan is thus treated by having an over-all geometric design or pattern impressed or formed therein, the pan will be greatly strengthened and the appearance vastly improved. The forming of an over-all pattern or design in the material of the pans removes all stress, strains, and buckles therefrom and conceals any and all defects which may occur in the material. Furthermore, pans so constructed may be readily handled during the display thereof without finger prints or smudge being obvious and glaring.

Certain types of pans such as cookie sheets when made of smooth, flat sheets warp readily and do not ship flat, whereas, when made in accordance with the present invention additional strength is provided throughout the walls, as well as at the edges thereof to prevent warpage and to maintain the pans at all times relatively flat.

By having the alternate depressions and projections over the surface of the pan wall or walls, the heating surface contacting with the contents of the pan is materially increased and there is a more uniform distribution of the grease over the entire pan surface. In this manner the baking in a pan made in accordance with the present invention is greatly improved over that in the pans with smooth flat walls.

Figure 1:
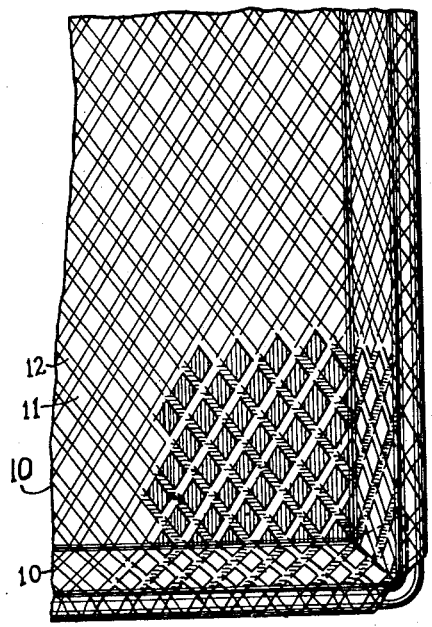
Fig. 1 is a fragmentary corner elevation of one type of pan embodying the present invention.

Reference being had more particularly to Figs. 1, 3 and 4 of the drawing, 10 designates the walls, either side or bottom, of a baking pan. These walls 10 are formed from sheets of any suitable metal and have alternate depressions 11 and elevations 12 created therein by stamping, rolling and by any other suitable means. The formation of the depressions 11 in one face of the wall 10 creates the elevations 12 on the opposite face of the wall, so that the depressions 11 and elevations 12 of one face of the wall are complemental to the similar elements of the opposed face of the wall.

Figure 2:
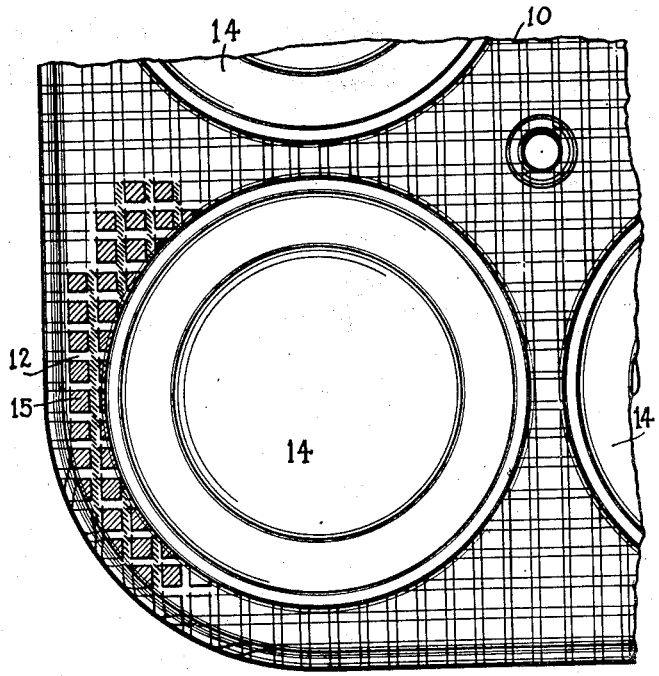
Fig. 2 is a similar view of a muffin frame illustrating the present construction incorporated therein.

The elevations 11 and projections 12 may be arranged in any suitable pattern, two examples of which are shown respectively in Figs. 1 and 2 of the drawing. By reference to Fig. 4 of the drawing it will be observed that the depressions 11 and elevations 12 may, if desired, be formed with the facets 13 which add to the strength of the wall and present a pleasing and attractive appearance.

In Fig. 2, showing the present invention applied to a muffin frame, the pattern is not applied to the cups 14, but is applied to the sheet or frame 15 in which the cups are carried. In this form of the invention the frame or sheet 15 is greatly strengthened and its appearance vastly improved.

In Fig. 3 is shown another application of the present invention, viz. the application thereof to a pie plate. Here the side wall 16 of the pan is plain but the bottom 10 thereof has the present invention applied thereto.

In practicing this invention the alternately arranged depressions 11 and elevations 12 arranged in any suitable pattern or design may be rolled, impressed or otherwise formed on the sheets of metal from which the pan is made prior to the formation of the pan, or may be formed in the pan walls during or after the formation of the pan. It has been found that where the sheets from which the pans are to be made are provided with the alternately arranged depressions and elevations 11—12, the same can be readily rolled into the metal but where they are placed in the pan wall or walls during or after the formation of the pan, it has been found desirable to do this by a stamping operation.

From the foregoing, it is manifest that the strength of the pan is greatly increased by the construction herein described; that dents, scars and defects in the metal will not be apparent; that any grease applied to the interior surface of the pan will settle and be held by the several depressions 11 and that the provision of facets 13 in combination with the depressions 11 and elevations 12 will create an extremely attractive and pleasing article.

What is claimed:

1. A sheet metal baking pan having a bottom stamped into alternate elevations and depressions, aligned in at least two directions.

2. A sheet metal baking pan having the material thereof stamped into alternate elevations and depressions aligned in at least two directions.

3. A sheet metal baking pan having a series of alternately arranged relatively shallow depressions and elevations aligned in at least two directions.

4. A sheet metal baking pan having a plurality of relatively small, shallow depressions formed therein arranged in rows in at least two directions, said rows being separated one from the other by continuous, relatively low and narrow elevations.

5. A sheet metal baking pan having a series of shallow, relatively small depressions formed in the bottom thereof and aligned in rows in at least two directions, said rows being separated one from the other by relatively low and narrow elevations, part of which are continuous and part interrupted by other elevations.

6. A metal baking pan having a plurality of separated relatively shallow, small depressions in the bottom and walls thereof.

JOSEPH G. JACKSON.